United States Patent
Daggett et al.

(10) Patent No.: US 10,059,435 B2
(45) Date of Patent: Aug. 28, 2018

(54) LOW DRAG SKIN HEAT EXCHANGER

(71) Applicant: Parker-Hannifin Corporation, Cleveland, OH (US)

(72) Inventors: David Lee Daggett, Snohomish, WA (US); Randy Utendorf, Cleveland Heights, OH (US); Irwin Lawson, Liberty Lake, WA (US)

(73) Assignee: Parker-Hannifin Corporation, Cleveland, OH (US)

( * ) Notice: Subject to any disclaimer, the term of this patent is extended or adjusted under 35 U.S.C. 154(b) by 221 days.

(21) Appl. No.: 14/959,366

(22) Filed: Dec. 4, 2015

(65) Prior Publication Data

US 2016/0159466 A1 Jun. 9, 2016

Related U.S. Application Data

(60) Provisional application No. 62/087,731, filed on Dec. 4, 2014.

(51) Int. Cl.
*B64C 23/00* (2006.01)
*B64C 23/06* (2006.01)
(Continued)

(52) U.S. Cl.
CPC .......... *B64C 23/005* (2013.01); *B64C 23/06* (2013.01); *B64D 33/10* (2013.01);
(Continued)

(58) Field of Classification Search
CPC ....... B64C 21/10; B64C 23/005; B64C 23/06; B64C 2230/10; B64C 2230/26;
(Continued)

(56) References Cited

U.S. PATENT DOCUMENTS

| 2,125,751 | A | * | 8/1938 | Saulnier | ................ | B64D 33/10 |
| | | | | | | 123/41.1 |
| 2,941,759 | A | * | 6/1960 | Schwartz | ............. | B64D 13/006 |
| | | | | | | 165/133 |

(Continued)

FOREIGN PATENT DOCUMENTS

| GB | 2389174 A | * 12/2003 | ............. F28D 15/02 |
| WO | 2013/149936 | 10/2013 | |

OTHER PUBLICATIONS

M.C. Gentry and A.M. Jacobi, "Heat Transfer Enhancement on a Flat Plate Design Delta-Wing Vortex Generators", ACRC TR-82, Jul. 1995; accessible from https://www.ideals.edu/bitstream/handle/2142/11042/TR082.pdf? . . . , accessed on Sep. 16, 2017.*

(Continued)

*Primary Examiner* — Tien Quang Dinh
*Assistant Examiner* — Alexander V. Giczy
(74) *Attorney, Agent, or Firm* — Renner, Otto, Boisselle & Sklar, LLP (57) ABSTRACT

A heat exchanger including a heat exchange panel having an exterior surface that forms an exterior surface portion of the vehicle (e.g. an aircraft), and including one or more vortex generators protruding from the exterior surface. The heat exchange panel has at least a portion made of a thermally conductive material. The one or more vortex generators are configured to direct airflow to particular areas on the aircraft, which may then prevent large scale airflow separation to synergistically enhance heat removal from the heat exchange panel and reduce drag of air flowing over the exterior surface.

20 Claims, 6 Drawing Sheets

(51) Int. Cl.
    *B64D 33/10*     (2006.01)
    *B64D 41/00*     (2006.01)

(52) U.S. Cl.
    CPC ....... *B64D 2041/005* (2013.01); *Y02T 50/162* (2013.01); *Y02T 90/36* (2013.01)

(58) Field of Classification Search
    CPC ...... B64D 13/006; B64D 33/10; B64D 33/12; F28D 2021/0021; F28F 13/02
    USPC .......................................................... 165/44
    See application file for complete search history.

(56) References Cited

U.S. PATENT DOCUMENTS

| | | | | |
|---|---|---|---|---|
| 3,015,461 | A * | 1/1962 | Fineblum | B64D 13/006 244/117 A |
| 3,550,678 | A | 12/1970 | Pfouts | |
| 3,741,285 | A * | 6/1973 | Kuethe | B64C 21/10 165/109.1 |
| 4,696,442 | A * | 9/1987 | Mazzitelli | B64C 23/06 244/200.1 |
| 4,819,720 | A * | 4/1989 | Howard | B64D 13/00 165/104.34 |
| 4,836,473 | A * | 6/1989 | Aulehla | B64C 21/00 244/130 |
| 5,058,837 | A * | 10/1991 | Wheeler | B64C 23/06 244/198 |
| 5,702,073 | A * | 12/1997 | Fluegel | B64C 1/38 165/171 |
| 6,641,084 | B1 * | 11/2003 | Huber | B64D 41/00 244/48 |
| 6,929,058 | B2 * | 8/2005 | Liu | F28F 3/12 165/104.33 |
| 2003/0145980 | A1 * | 8/2003 | Sinha | B64C 21/10 165/104.21 |
| 2003/0150955 | A1 * | 8/2003 | Daggett | B64C 21/00 244/57 |
| 2010/0302730 | A1 * | 12/2010 | Hernon | F28F 13/12 361/694 |
| 2011/0146957 | A1 * | 6/2011 | Buchholz | B64D 13/00 165/104.26 |
| 2011/0186263 | A1 | 9/2011 | Piesker | |
| 2012/0227950 | A1 * | 9/2012 | Weber | B64D 13/06 165/185 |
| 2013/0112374 | A1 * | 5/2013 | Murray | B64D 33/12 165/104.26 |
| 2013/0331019 | A1 | 12/2013 | Piesker | |
| 2014/0044525 | A1 | 2/2014 | Storage et al. | |
| 2014/0212297 | A1 * | 7/2014 | Goeller | F01D 5/187 416/96 A |
| 2015/0246719 | A1 * | 9/2015 | Pelissier | B64C 1/12 244/120 |
| 2016/0097599 | A1 * | 4/2016 | Iwasaki | F28F 3/027 165/175 |
| 2017/0266691 | A1 * | 9/2017 | Travis | B29C 59/04 |

OTHER PUBLICATIONS

Markus Rütten et al., Heat Transfer Enhancement by Using Vortex Generators, 8th. World Congress on Computational Mechanics (WCCM8), 5th European Congress on Computational Methods in Applied Sciences and Engineering, (ECCOMAS 2008), Jun. 30-Jul. 5, 2008, 2 pages.

Thermacore, Active Heat Sink Technology Can Deliver Added Performance, Extended Capabilities in High-Power Electronic Devices, Apr. 17, 2010, pp. 1-4.

K.C. Felton et al., Heat Transfer and Pressure Drop in a Developing Channel Flow with Streamwise Vortices, University of Illinois, ACRC Project 40, Vortex-Induced Air-Side Heat Transfer Enhancement in Air-Conditioning and Refrigeration Applications, Sep. 1996, 109 pages.

Goebel, Greg, The Rockwell B-1, Airvectors.net, May 1, 2014, available at: http://www.airvectors.net/avb1.html, archive available at: https://web.archive.org/web/20141012004243/http://www.airvectors.net/avb1.html.

* cited by examiner

LOW DRAG SKIN HEAT EXCHANGER

This application claims the benefit of U.S. Provisional Application No. 62/087,731 filed Dec. 4, 2014, which is hereby incorporated herein by reference.

FIELD OF INVENTION

The present invention relates generally to vehicle heat exchangers, and more particularly to low drag heat exchangers for aircraft.

BACKGROUND

Aircraft are generally designed with gentle curves and smooth surfaces to enable streamlined airflows and decreased drag, thereby increasing overall fuel efficiency of the aircraft while in flight. On some aircraft that experience airflow disturbances or separation, vortex generators have been used to reduce aerodynamic instabilities and associated drag and noise.

Aircraft also contain internal heat generating components and systems, such as Fuel Cell Emergency Power Systems ("FCEPS"). Typically, aircraft dissipate this heat to the atmosphere through air heat exchangers. These heat exchangers tend to be heavy, which reduces available transport capacity of the aircraft. Also, the heat exchangers tend to have a large surface area to counter inhibited mixing and heat dissipation caused by heated airflow boundary layers.

SUMMARY OF INVENTION

The present invention provides a heat exchanger including a heat exchange panel having an exterior surface that forms an exterior surface portion of the vehicle (e.g. an aircraft), and including one or more vortex generators protruding from the exterior surface. The heat exchange panel has at least a portion made of a thermally conductive material. The one or more vortex generators are configured to direct airflow to particular areas on the aircraft, which may then prevent large scale airflow separation to synergistically enhance heat removal from the heat exchange panel and reduce drag of air flowing over the exterior surface. For example, the vortex generator also improves the surface mixing of air flowing over the exterior surface of the heat exchange panel.

The vortex generator may be disposed on an outer skin of an aircraft, such as a portion of an aircraft experiencing airflow separation, which allows increased surface mixing of air passing by the vortex generator. For example, the vortex generator may be disposed on an aft empennage upsweep. The increased mixing allows a high heat transfer rate between the heat exchange panel and air passing by without increasing a surface area of the heat exchange panel. The heat exchange panel may be thermally connected to a heat generating device inside the aircraft, such as an FCEPS, to remove excess heat from the heat generating device.

According to one aspect of the invention, a vehicle including a heat exchange panel having an exterior surface forming an exterior surface portion of the vehicle, the exterior surface having at least a portion made of a thermally conductive material, and one or more vortex generators protruding from the exterior surface and configured to prevent separation of flow to reduce drag of air flowing over the exterior surface of the heat exchange panel as the vehicle travels in a forward direction.

The exterior surface may be thermally connected to a heat generating device.

The exterior surface and the heat generating device may be connected through one or more fluid carrying conduits.

The heat generating device may include a fuel cell emergency power system.

The vehicle may further include one or more internal flow passages in at least one of the one or more vortex generators through which a heat exchange fluid can pass.

The vehicle may further include one or more internal flow paths within the heat exchange panel for directing fluid flowing within the heat exchange panel.

The one or more flow paths may be disposed between the exterior surface and an interior surface of the heat exchange panel.

The one or more flow paths may be fluidly connected with an inlet and an outlet of the heat exchange panel.

The vehicle may be an aircraft.

The one or more vortex generators may be disposed along a fuselage of the aircraft.

The one or more vortex generators may be disposed at the junction of an empennage upsweep and the main body of the aircraft.

Each of the vortex generators may have a sloped profile for guiding an air stream flowing therepast.

Each of the vortex generators may have a sloped profile to reduce drag.

According to another aspect of the invention, a heat exchanger or a vehicle, the heat exchanger comprising a panel having an exterior surface and an internal flow passage for flow of a heat exchange fluid that transfers heat to a thermally conductive portion of the exterior surface, and one or more vortex generators protruding from an exterior surface of the panel.

The panel may be configured for mounting to an aircraft at the exterior of the aircraft.

The panel may have a fluid inlet and outlet for receiving and returning a heat exchange fluid that extracts heat from a heat generating device.

According to another aspect of the invention, a heat exchanger including a heat exchange panel having an exterior surface forming an exterior surface portion of a vehicle, the exterior surface having at least a portion made of a thermally conductive material, and one or more vortex generators protruding from the exterior surface and configured to prevent separation of flow to reduce drag of air flowing over the exterior surface of the heat exchange panel.

According to another aspect of the invention, a vehicle including a heat exchange panel having an exterior surface configured to form an exterior surface portion of the vehicle, the exterior surface having at least a portion made of a thermally conductive material, and one or more vortex generators protruding from the exterior surface and configured to prevent separation of flow to reduce drag of air flowing over the exterior surface of the heat exchange panel as the vehicle travels in a forward direction.

The exterior surface may be thermally connected to a heat generating device.

The exterior surface and the heat generating device may be connected through one or more fluid carrying conduits.

The heat generating device may include a fuel cell emergency power system.

The vehicle may further include one or more internal flow paths in at least one of the one or more vortex generators, and each internal flow path may guide internal fluid across an exterior wall forming the exterior surface.

The vehicle may further include one or more internal flow paths within the heat exchange panel for directing fluid flowing within the heat exchange panel.

The one or more flow paths may extend between the exterior surface and an interior surface of the heat exchange panel.

The one or more flow paths may be fluidly connected with an inlet and an outlet of the heat exchange panel.

The vehicle may be an aircraft.

The one or more vortex generators may be disposed along a fuselage of the aircraft.

The one or more vortex generators may be disposed between an empennage upsweep and a bow of the aircraft.

Each of the vortex generators may have a forward surface sloped relative to the panel for directing airflow downstream of the vortex generators.

Each of the vortex generators may have a forward surface sloped relative to the panel for reducing drag.

Fluid may flow past each vortex generator, whereby each vortex generator reduces large scale airflow separation on the aircraft to reduce drag and increases surface heat transfer from the exterior surface to the fluid.

The fluid may be air.

According to another aspect of the invention, an exterior surface panel for a vehicle, the exterior surface panel including an exterior surface having one or more vortex generators thereon, wherein the exterior surface is thermally conductive.

The exterior surface panel may be configured to secure to an outer portion of an aircraft.

The exterior surface may be thermally connected to a heat generating device.

The exterior surface and the heat generating device may be connected through one or more fluid carrying conduits.

The heat generating device may include a fuel cell emergency power system.

The exterior surface panel may further include one or more internal flow paths in at least one of the one or more vortex generators, and each internal flow path may be fluidly connected to an exterior wall forming the exterior surface.

The exterior surface panel may further include one or more internal flow paths for directing fluid flowing within the exterior surface panel.

The one or more flow paths may extend between the exterior surface and an interior surface of the exterior surface panel.

The one or more flow paths may be fluidly connected with an inlet and an outlet of the exterior surface panel.

An aircraft may include the exterior surface panel.

The one or more vortex generators may be disposed along a fuselage of the aircraft.

The one or more vortex generators may be disposed between an empennage upsweep and a bow of the aircraft.

Each of the vortex generators may have a forward surface sloped relative to the panel for reducing drag.

Fluid may flow past each vortex generator, whereby each vortex generator reduces large scale airflow separation on the aircraft to reduce drag and increases surface heat transfer from the exterior surface to the fluid.

According to another aspect of the invention, a heat exchanger including a heat exchange panel having an exterior surface configured to form an exterior surface portion of a vehicle, the exterior surface having at least a portion made of a thermally conductive material, and one or more vortex generators protruding from the exterior surface and configured to prevent separation of flow to reduce drag of air flowing over the exterior surface of the heat exchange panel.

The exterior surface may be thermally connected to a heat generating device.

The exterior surface and the heat generating device may be connected through one or more fluid carrying conduits.

The heat generating device may include a fuel cell emergency power system.

The heat exchanger may further include one or more internal flow paths in at least one of the one or more vortex generators, wherein each internal flow path is fluidly connected to an exterior wall forming the exterior surface.

The heat exchanger may further include one or more internal flow paths within the heat exchange panel for directing fluid flowing within the heat exchange panel.

The one or more flow paths may extend between the exterior surface and an interior surface of the heat exchange panel.

The one or more flow paths may be fluidly connected with an inlet and an outlet of the heat exchange panel.

An aircraft may include the heat exchanger.

The one or more vortex generators may be disposed along a fuselage of the aircraft.

The heat exchange panel may be disposed between an empennage upsweep and a bow of the aircraft.

Each of the vortex generators may have a forward surface sloped relative to the panel for reducing drag. Fluid may flow past each vortex generator, whereby each vortex generator reduces large scale airflow separation on the aircraft to reduce drag and increases surface heat transfer from the exterior surface to the fluid.

The foregoing and other features of the invention are hereinafter described in greater detail with reference to the accompanying drawings.

DETAILED DESCRIPTION

The principles of this present application have particular application to heat exchangers for vehicles, such as an aircraft, and thus will be described below chiefly in this context. It will of course be appreciated, and also understood, that principles of this invention may be applied in other applications where both heat transfer and reduced drag are desired.

Figure 1:
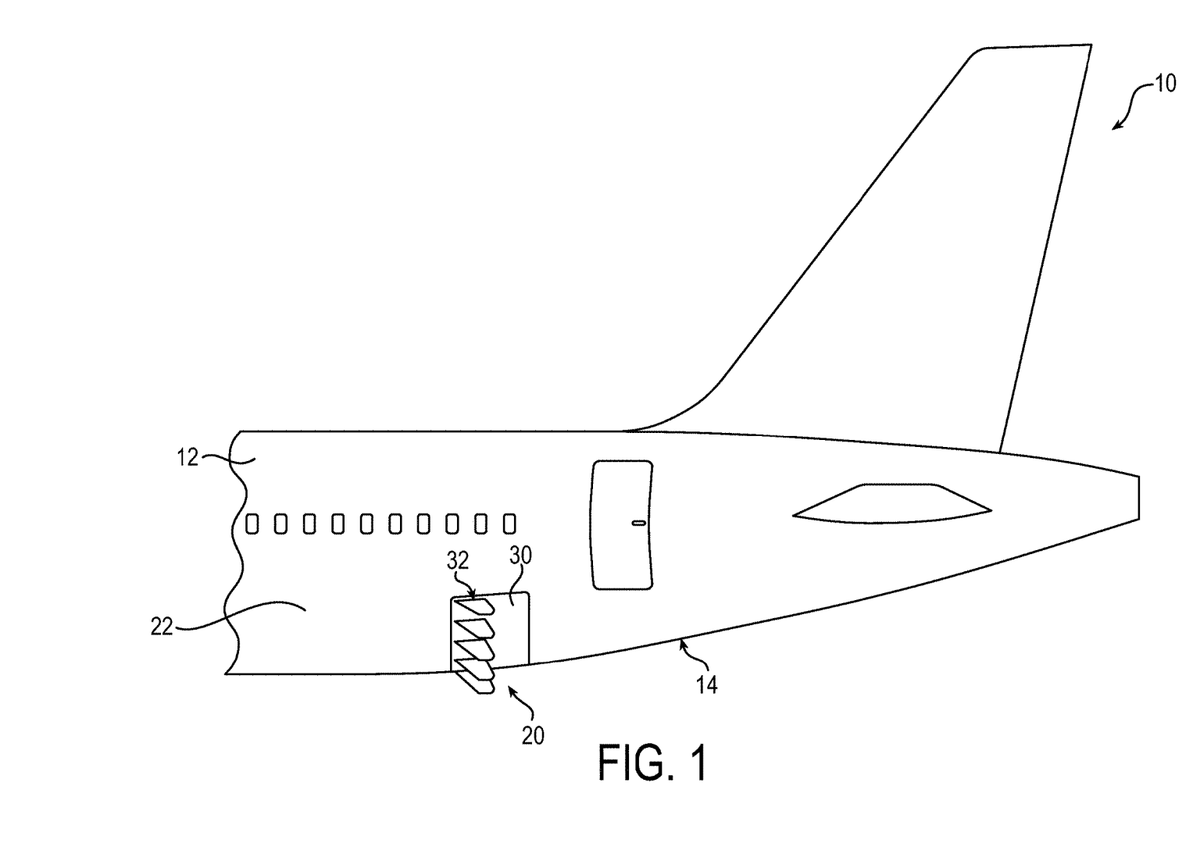
FIG. 1 is a partial perspective view of an aircraft with an exemplary heat exchanger.

Referring now in detail to the drawings, and initially to FIG. 1, an aircraft 10 is illustrated. The aircraft 10 may be of any type, such as a commercial airliner. The aircraft 10 may include an outer skin 12 forming an outer surface of the aircraft 10, an empennage upsweep 14, and a heat exchanger 20. The heat exchanger 20 may be disposed on or flush with the outer skin 12. The heat exchanger 20 includes a heat exchange panel 30 and a plurality of vortex generators 32.

The vortex generators 32 may be positioned for optimal heat transfer. For example, the vortex generators 32 may be disposed at an end of the heat exchange panel 30 that receives an incoming air stream to increase heat transfer between a downstream portion of the incoming air stream and a downstream portion of the heat exchange panel 30.

The heat exchange panel 30 may be mounted to the aircraft 10 at any strategic location, such as to position the vortex generators 32 at a desirable location along a fuselage 22 of the aircraft 10. The vortex generators 32 may be placed on any portion of the aircraft 10, for example a portion that is experiencing airflow separation. More preferably, the vortex generators 32 may be disposed at a junction of the forward end of the empennage upsweep 14 and a generally horizontal portion of the fuselage 22. Alternatively, the vortex generators may be at least partially disposed on the empennage upsweep in an aft portion of the aircraft. In an embodiment, the vortex generators are disposed at an optimal location for reducing drag on the aircraft so that flow separation may be maximally prevented while achieving the added benefit of efficient heat exchange. In another embodiment, the vortex generators are disposed at an optimal location for heat exchange so that heat may be maximally transferred from the heat exchange panel and/or the vortex generators.

Figure 2:
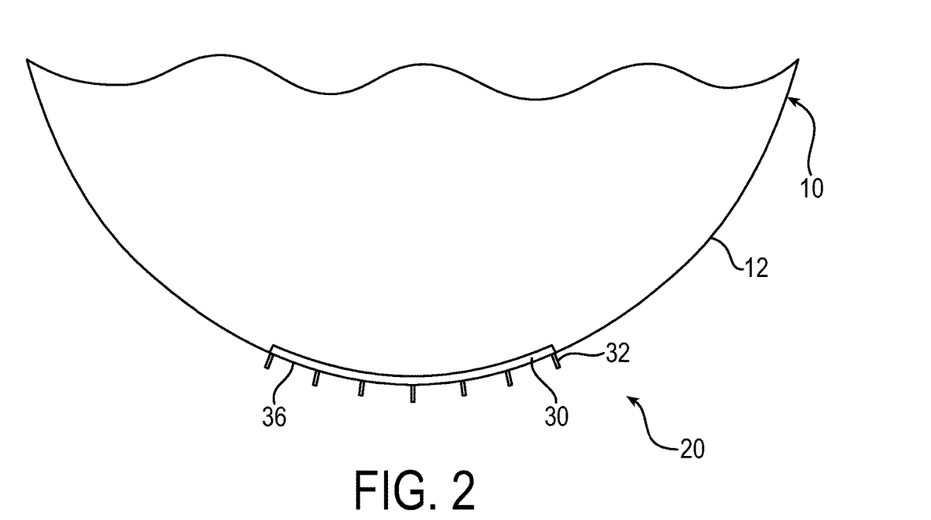
FIG. 2 is a partial cross-sectional view of the aircraft of FIG. 1.
Figure 3:
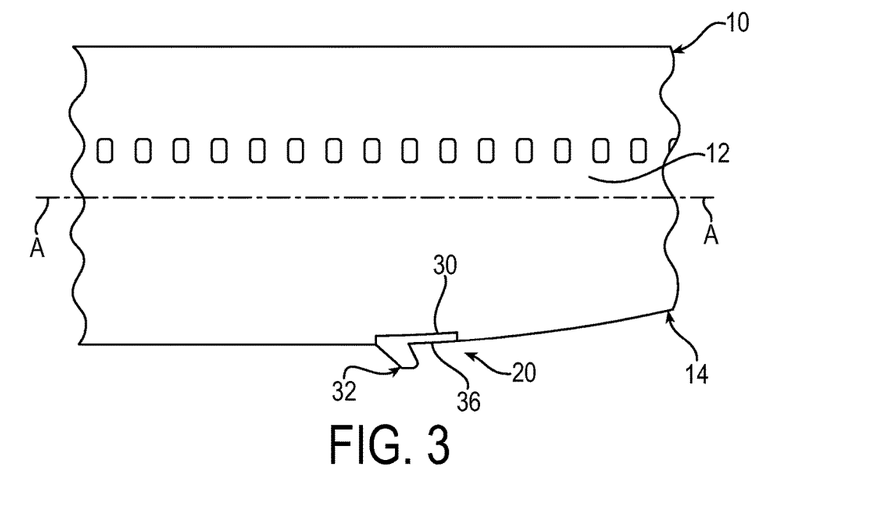
FIG. 3 is a side elevational view of the aircraft of FIG. 1.

Referring now to FIGS. 2 and 3, the plurality of vortex generators 32 may protrude from an exterior surface 36 the heat exchange panel 30.

As the aircraft 10 moves through an external fluid (e.g., air) the external fluid flows along the outer skin 12 and subsequently transfers heat from the exterior surface 36 of the heat exchange panel 30.

The exterior surface 36 may extend rearward of the vortex generators 32 to form an extended heat transfer surface that may be aligned with the outer skin 12 to form a flush surface with the outer skin 12. Extending the exterior surface 36 also allows exposure of the external fluid to a larger heat transfer surface. In an embodiment, the exterior surface extends forward of the vortex generators to form an extended heat transfer surface. In another embodiment, the exterior surface extends forward and backward of the vortex generators to form an extended heat transfer surface.

Preferably, an internal fluid flows in a countercurrent direction compared to the external fluid over the rearward extending heat transfer surface to remove as much heat as possible from the internal fluid.

The exterior surface 36 is preferably formed by an exterior or skin panel of the aircraft to be flush with adjacent aircraft panels. Forming the exterior surface 36 flush with adjacent aircraft panels allows reduction of a drag coefficient of the outer skin 12, thereby facilitating greater heat transfer from the exterior surface 36. Preferably the exterior surface 36 forms an aerodynamic profile or a continuation of an aerodynamic profile of the aircraft 10 that is formed by aircraft panels.

One of the aircraft panels may include a recess to include the heat exchange panel 30 and allow the exterior surface 36 to be flush with adjacent aircraft panels forming the outer skin 12.

The entire exterior surface 36 may be thermally conductive to transfer heat to the external fluid. In an embodiment, only a portion of the exterior surface is thermally conductive.

Heat transfer rates of the exterior surface 36 may be increased and drag may be further reduced with the vortex generators 32 compared to the exterior surface 36 without the vortex generators 32. Each vortex generator 32 may protrude outwardly from the exterior surface 36. Each vortex generator 32 allows a reduction of flow separation downstream, which allows a reduction of drag. Preventing flow separation keeps airflow along over the exterior surface 36, which allows for greater heat transfer between the fluid flow and the exterior surface 36 and/or each vortex generator 32.

Figure 4:
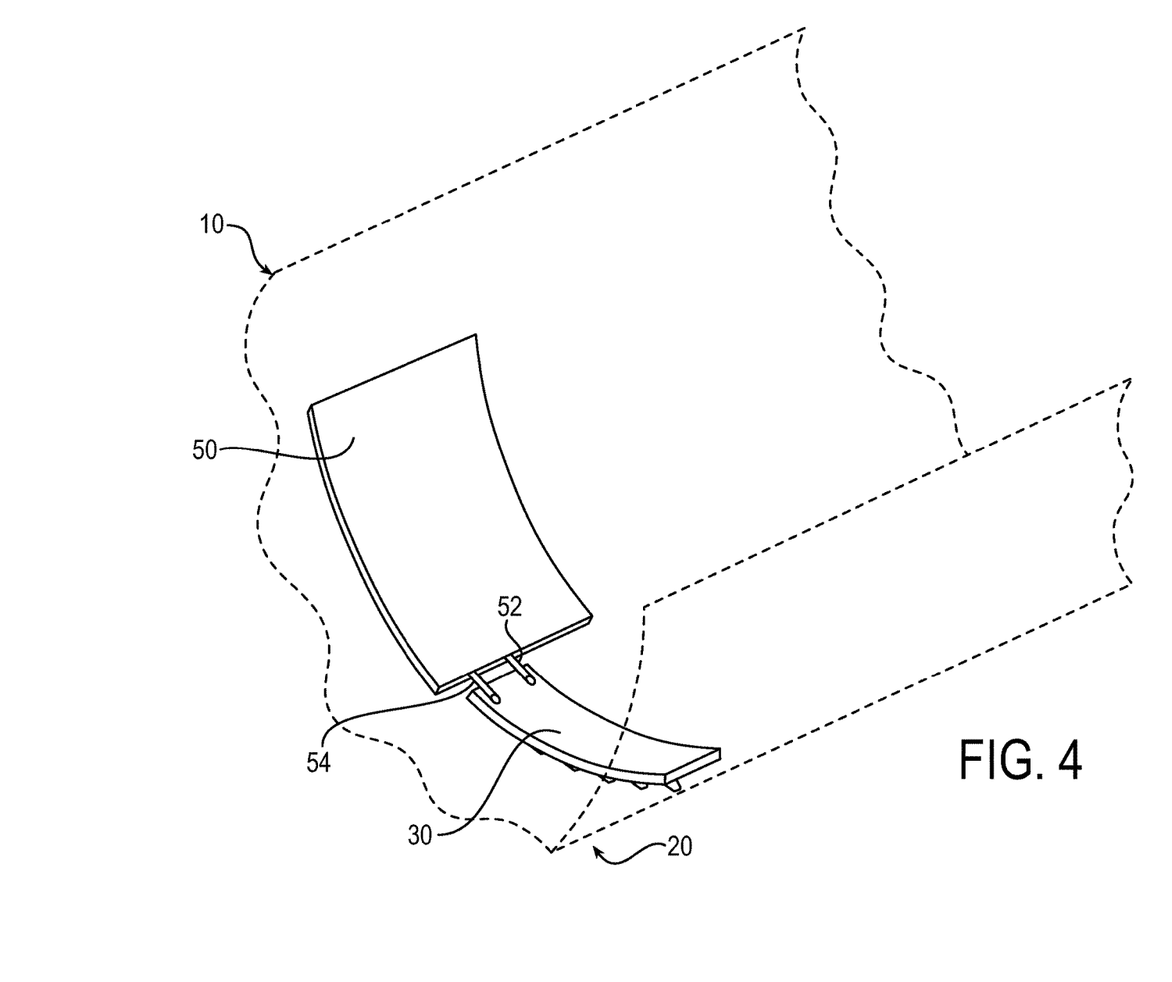
FIG. 4 is a partial perspective view of a fuselage of the aircraft of FIG. 1, where the fuselage is shown semi-transparent for illustrative purposes.

Referring to FIG. 4, the heat exchange panel 30 is thermally connected to a heat generating device 50. The connection may be made through an input conduit 52 and an output conduit 54 to transfer heat from the heat generating device 50 to the air through the exterior surface 36.

The heat generating device 50 may be any device that generates heat that needs to be disipated, such as a FCEPS. FCEPS's are common in aircraft as a short-term energy backup, but the systems tend to produce heat that is not easily dissipated when the aircraft is running on backup power.

A small pump (not shown) may pressurize the internal fluid to flow through the heat exchange panel 30 to facilitate heat transfer. The small pump may require some energy to function. In an embodiment, a pump is not provided and the heat exchange panel is a solid thermally conductive material to allow passive heat transfer. The heat exchanger 20 may reduce fuel required to propel the aircraft 10 due to the reduced drag and may consume minimal backup power to dissipate heat through the input conduit 52 and the output conduit 54. Thus, the heat exchanger 30 may provide synergistic heat removal, fuel savings and back up power savings.

The heat generating device 50 may be located anywhere in the aircraft 10 and thermally connected to the heat exchanger 20. Preferably, the heat generating device 50 is located near the heat exchange panel 30 to increase the rate of heat transfer from the heat generating device 50 to the heat exchanger 20 through the conduits 52 and 54.

The input conduit 52 may carry fluid, such as water, oil or another suitable fluid. For example, the input conduit 52 may be a tube connected to the heat generating device 50 and an inlet 60 (shown in FIG. 5) of the heat exchange panel 30. The input conduit 52 may be made of thermally conductive or thermally insulative material. Preferably an exterior portion of the input conduit 52 is thermally insulative to prevent heat transfer to an interior of the aircraft 10. Heat from the heat generating device 50 is dissipated by the heat exchanger 20 and cooler fluid may flow from the heat exchange panel 30 to the output conduit 54 to absorb heat from the heat generating device 50.

The output conduit 54 may carry the internal fluid from the heat exchange panel 30 to the heat generating device 50. For example, the output conduit 54 may be a tube connected to the heat generating device 50 and an outlet 62 (shown in FIG. 5) of the heat exchange panel 30. The output conduit 54 may be made of thermally conductive or thermally insulative material. Preferably an exterior portion of the output conduit 54 is thermally insulative to prevent heat transfer to an interior of the aircraft 10.

Figure 5:
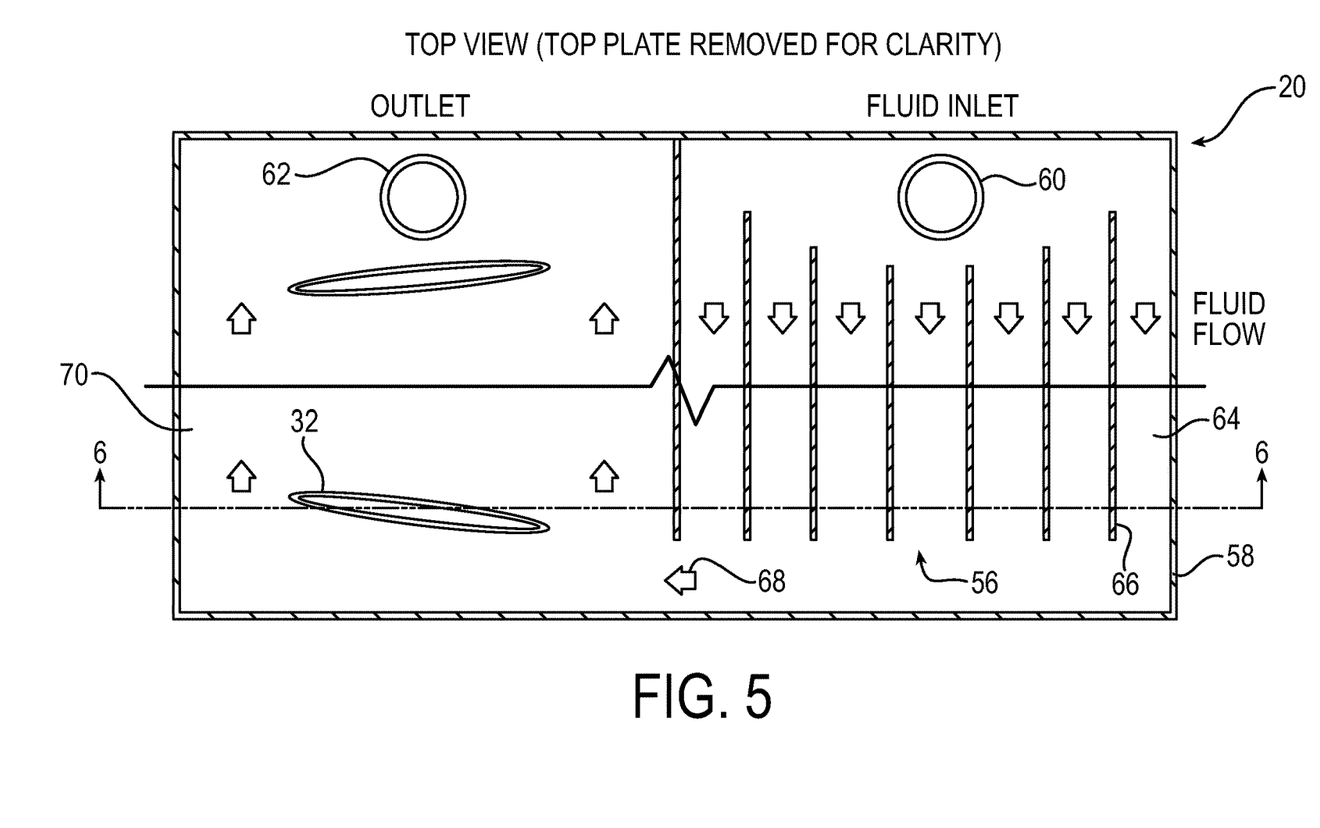
FIG. 5 is a cross-sectional view of the heat exchanger of FIG. 1.
Figure 6:
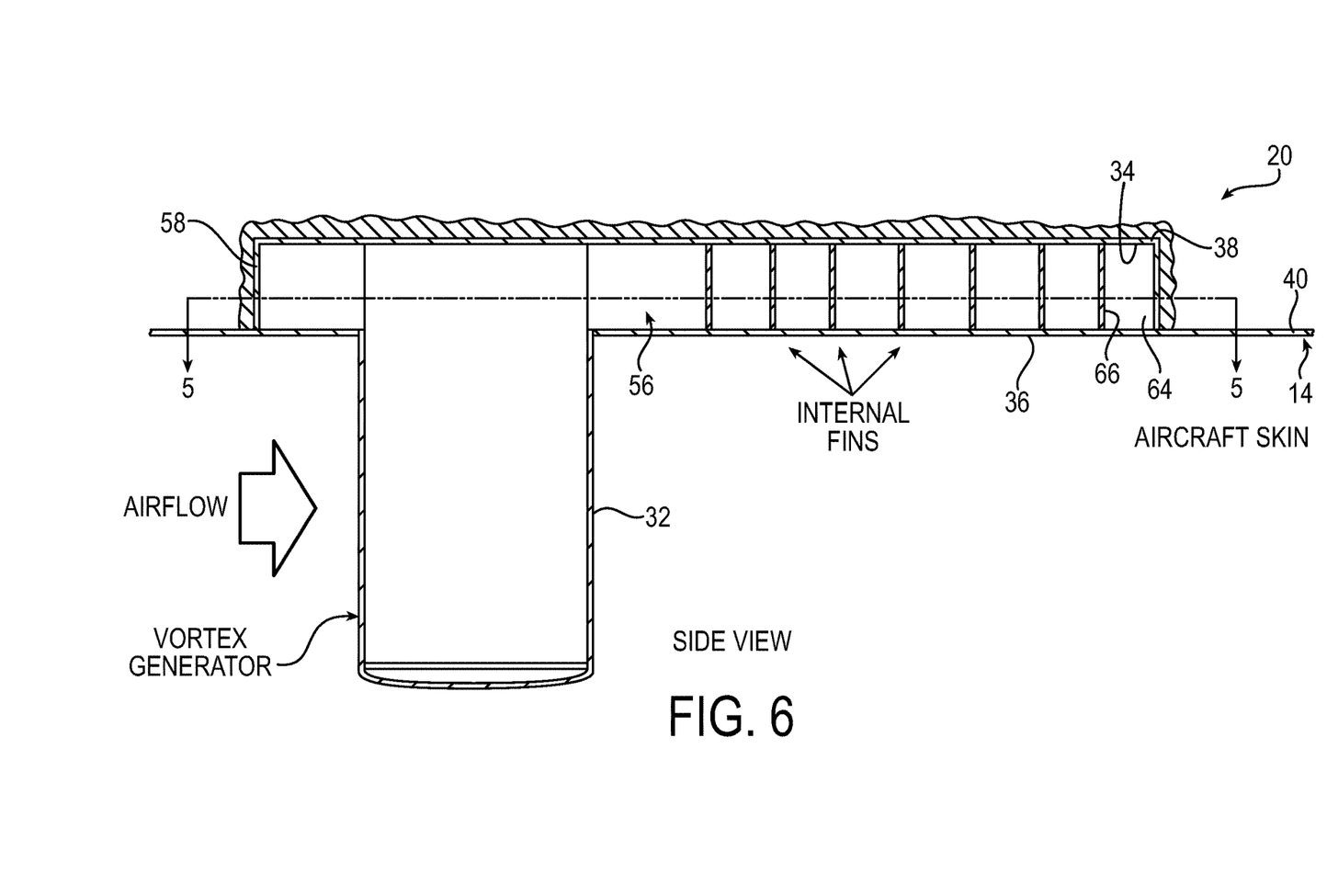
FIG. 6 is a cross-sectional view of the heat exchanger of FIG. 5.

It will be appreciated that other methods of transferring heat from the heat generating device 50 to the heat exchange panel 30 may be implemented, such as thermally connecting the heat generating device with a solid rod Referring to FIGS. 5 and 6, the heat exchange panel 30 may have an interior space 56 to allow interior fluid flow. The interior space 56 is defined by an interior wall 38 that forms an interior surface 34, an exterior wall 40 that forms the exterior surface 36 and a plurality of side walls 58 extending along a perimeter of the interior surface 34 and the exterior surface 36.

The interior wall may include the fluid inlet 60 and the fluid outlet 62. Both the fluid inlet 60 and the fluid outlet 62 may fluidly connect to the interior space 56 to facilitate fluid flow and heat transfer to the exterior surface 36.

The interior space 56 may include a plurality of input flow paths 64 separated by a plurality of fins 66 and an output flow path 70 fluidly connected to the outlet 62.

The input flow paths 64 are internal to the heat exchange panel 30 and may be parallel to one another and extend between the interior surface 34 and the exterior surface 36 to dissipate heat from the fluid through the exterior surface 36. The internal fluid enters the input flow paths 64 at a high temperature just after passing through the inlet 60 into the input flow paths 64. Heat from the internal fluid transfers to the exterior surface 36 through at least one of the exterior wall 40 and/or the fins 66.

Preferably the exterior wall 40 and/or the fins 66 are made of a thermally conductive material to transfer heat from the internal fluid to the external fluid through the exterior surface 36. For example, the exterior wall 40 and the fins 66 may be made of a thermally conductive material with a minimum conductivity of 20 W/(M*K), preferably a minimum conductivity of 100 W/(M*K) and more preferably a minimum conductivity of 150 W/(M*K). For example, the exterior wall 40 and fins 66 may be made of an aluminum material, such as aluminum, aluminum allows, or any combination thereof. In an embodiment, heat transfers primarily from a thermally conductive portion of the exterior wall and the vortex generators primarily increase external fluid flow over the thermally conductive portion. In another embodiment, the entire heat transfer panel is made of the same material.

The internal fluid may flow from the inlet 60 to an opposite end of the flow paths 64 laterally from the input flow paths 64 to a lateral opening 68 to the output flow path 70.

The output flow path 70 may include a radially inward end of each vortex generator 32 and direct fluid to the fluid outlet 62. The fluid may be directed from the fluid outlet 62 back to the heat generating device 50 to absorb more heat and cycle back through the heat exchanger 30.

The external fluid generally flows along a longitudinal axis A (FIG. 3) corresponding to the direction of travel of the aircraft (e.g., when the aircraft flies forward (to the left when viewing FIG. 3) the external fluid generally flows rearward (to the right when viewing FIG. 3) relative to the forward movement of the aircraft). Thus, as the aircraft 10 moves, the fluid flows over the exterior surface 36 of the heat exchange panel 30 and along the vortex generators 32 to allow heat transfer from the exterior surface 36 to an external fluid. The vortex generators 32 may conduct heat from the exterior wall 40 and/or the internal fluid to the external fluid.

The interior surface 34 may be inwardly offset from each adjacent aircraft panel forming the outer skin 12. Offsetting the interior surface 36 allows more space between the interior surface 34 and the exterior surface 36 to facilitate interior fluid flow. The interior surface 34 may have a contour that is curved or flat depending on the placement of the heat exchange panel 30. Also, the interior surface may be parallel to the exterior surface 36. In an embodiment, the interior surface is aligned with each adjacent aircraft panel. In another embodiment, at least a portion of the interior surface is thermally insulative.

As fluid flows between the interior surface 34 and the exterior surface, heat transfer is preferably inhibited. For example, a thermally insulative material may be placed around the interior surface 34 and the side walls 58 to prevent heat transfer into the interior of the aircraft 10. Alternatively, the interior surface or the interior wall may be formed at least partially of a thermally insulative material to inhibit heat transfer into the aircraft and to enhance heat transfer to the external fluid.

Heat transfer to the external fluid is maximized by increasing drag reduction and the external fluid flow. Drag reduction and the external fluid flow are affected by the geometry of each vortex generator 32. For example, the vortex generator 32 may protrude from the exterior surface 36 with a sloped profile toward the stern end of the aircraft 10. The sloped profile is able to receive an incoming air stream and reduce drag. For example, the sloped profile may receive an incoming air stream and preferentially direct the airflow downstream of the device to prevent large scale flow separation. In an embodiment, any other suitable shape or type of vortex generator may be utilized, such as rectangular or riblet vortex generators.

During use the fluid external to the heat exchanger 20 flows past each vortex generator 32, whereby each vortex generator 32 reduces flow separation to reduce drag and increase heat transfer from the heat exchanger 20 to the fluid. The fluid internal to the heat exchanger 20 may dissipate heat through the heat exchange panel 30 due to the increased heat transfer to the external fluid.

In alternative embodiments, the vehicle may be a car, truck, boat, or submarine.

Figure 7:
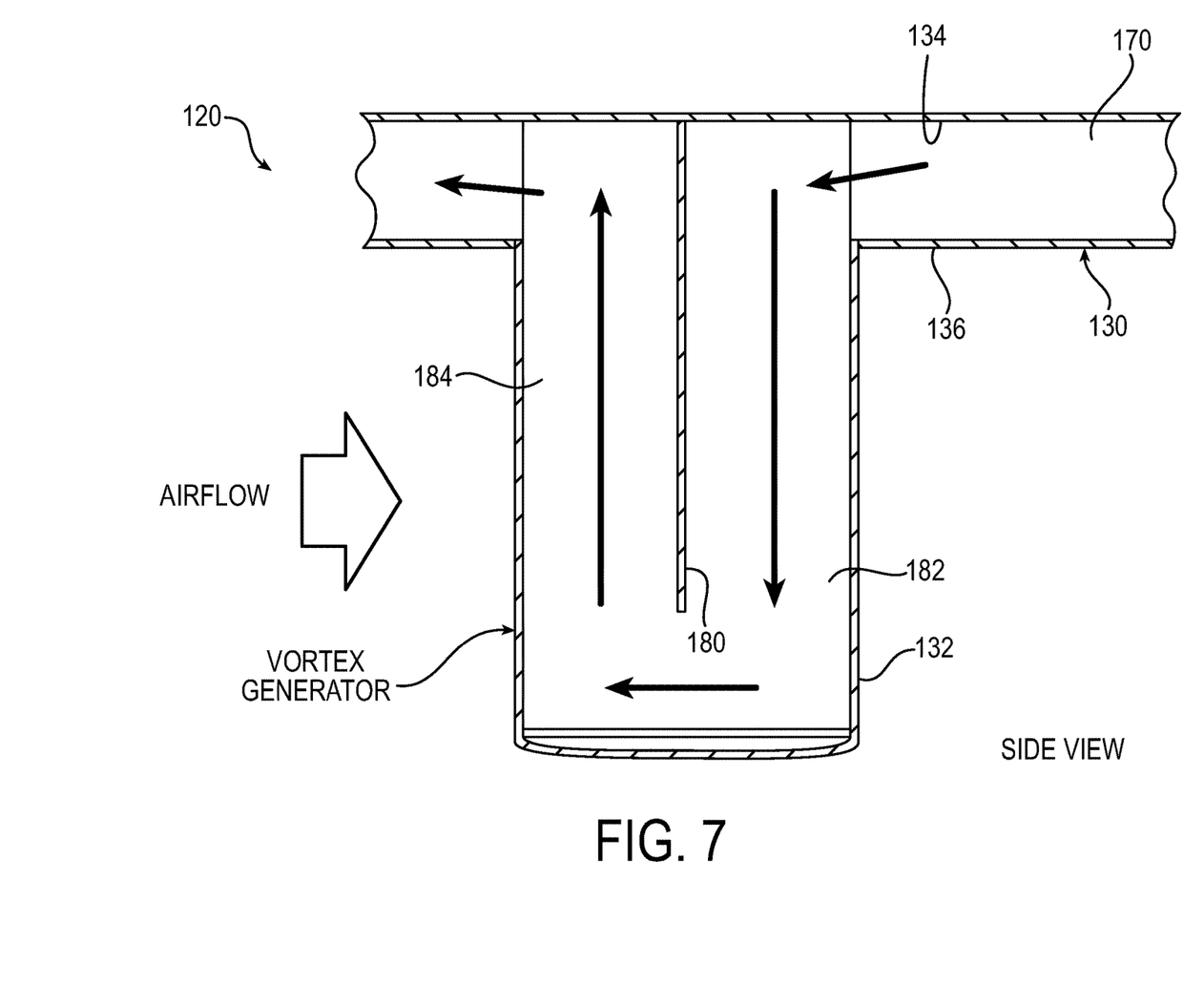
FIG. 7 is a cross-sectional view of another exemplary heat exchanger.

Turning now to FIG. 7, an exemplary embodiment of the heat exchanger is shown at 120. The heat exchanger 120 is substantially the same as the above-referenced heat exchanger 20, and consequently the same reference numerals but indexed by 100 are used to denote structures corresponding to similar structures in the heat exchanger 120. In addition, the foregoing description of the heat exchanger 20 is equally applicable to the heat exchanger 120 except as noted below. Moreover, it will be appreciated upon reading and understanding the specification that aspects of the heat exchangers may be substituted for one another or used in conjunction with one another where applicable.

The heat exchanger 120 may include a heat exchange panel 130 fluidly connected to a vortex generator 132 through an output flow path 170.

The vortex generator 132 may include a fin 180 that separates a vortex input flow path 182 that is internal to the vortex generator 132 from a vortex output flow path 184 that is internal to the vortex generator 132. During use internal fluid may flow between an interior surface 134 and an exterior surface 136 through the output flow path 170 to dissipate heat to external fluid, such as air. Also, the internal fluid may flow from the output flow path 170 to the vortex input flow path 182 back out through the vortex output flow path 184. Directing the internal fluid through the vortex generator allows greater heat dissipation from the internal fluid to external fluid flowing over the exterior surface 136 and adjacent the vortex generator 132.

Preferably the vortex generator 132 is made of a thermally conductive material to transfer heat to the external fluid. For example, the vortex generator may be made of a thermally conductive material with a minimum conductivity of 20 W/(M*K), preferably minimum conductivity of 100 W/(M*K) and more preferably a minimum conductivity of 150 W/(M*K). For example, the vortex generator may be made of an aluminum material.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A vehicle including:
    a heat exchange panel having an exterior surface forming an exterior surface portion of the vehicle, the exterior surface having at least a portion made of a thermally conductive material; and
    one or more vortex generators protruding from the exterior surface and configured to prevent separation of flow to reduce drag of air flowing over the exterior surface of the heat exchange panel as the vehicle travels in a forward direction.

2. The vehicle of claim 1, wherein the exterior surface is thermally connected to a heat generating device.

3. The vehicle of claim 2, wherein the exterior surface and the heat generating device are connected through one or more fluid carrying conduits.

4. The vehicle of claim 2, wherein the heat generating device includes a fuel cell emergency power system that is thermally connected to the exterior surface.

5. The vehicle of claim 1, wherein the vehicle is an aircraft.

6. The aircraft of claim 5, wherein the one or more vortex generators are disposed along a fuselage of the aircraft.

7. The aircraft of claim 5, wherein the one or more vortex generators are disposed at a junction of an empennage upsweep and a main body of the aircraft.

8. A heat exchanger for a vehicle, the heat exchanger comprising:
    a panel having an exterior surface and an internal flow path for flow of a heat exchange fluid that transfers heat to a thermally conductive portion of the exterior surface, and
    one or more vortex generators protruding from the exterior surface of the panel to reduce drag.

9. The heat exchanger of claim 8, wherein the panel is configured for mounting to an aircraft at the exterior of the aircraft.

10. The heat exchanger of claim 9, wherein the panel has an exterior wall forming the exterior surface, and a plurality of fins extend from an inner surface of the exterior wall into the internal flow path.

11. The heat exchanger of claim 8, wherein the panel has a fluid inlet and a fluid outlet for receiving and returning the heat exchange fluid that extracts heat from a heat generating device.

12. The heat exchanger of claim 8, further including one or more internal flow passages in at least one of the one or more vortex generators, wherein each internal flow passage is fluidly connected to the internal flow path.

13. The heat exchanger of claim 8, further including one or more additional internal flow paths for directing fluid flowing within the panel.

14. The heat exchanger of claim 13, wherein the one or more additional flow paths extend between the exterior surface and an interior surface of the panel.

15. The heat exchanger of claim 13, wherein the one or more additional flow paths are fluidly connected with an inlet and an outlet of the panel.

16. An aircraft including the heat exchanger of any one of claim 8, wherein the one or more vortex generators are disposed along a fuselage of the aircraft.

17. A heat exchanger including:
    a heat exchange panel having an exterior surface forming an exterior surface portion of a vehicle, the exterior surface having at least a portion made of a thermally conductive material; and
    one or more vortex generators protruding from the exterior surface and configured to prevent separation of flow to reduce drag of air flowing over the exterior surface of the heat exchange panel.

18. The heat exchanger of claim 17, wherein the heat exchange panel has an exterior wall forming the exterior surface, and a plurality of fins extend from an inner surface of the exterior wall into an internal flow passage.

19. An aircraft including the heat exchanger of claim 17, wherein the one or more vortex generators are disposed along a fuselage of the aircraft.

20. The heat exchanger of claim 17, wherein each of the vortex generators has a sloped profile to reduce drag.

* * * * *